(12) United States Patent
Wakisaka et al.

(10) Patent No.: US 7,319,384 B2
(45) Date of Patent: Jan. 15, 2008

(54) COMMUNICATION APPARATUS AND COMMUNICATION METHOD

(75) Inventors: Toshiyuki Wakisaka, Izuka (JP); Yuji Igata, Chikushino (JP); Kazuaki Kusune, Chikushino (JP); Akihiro Yamashita, Miyaki-gun (JP); Fumio Ichihara, Chikushi-gun (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 216 days.

(21) Appl. No.: 11/317,258

(22) Filed: Dec. 27, 2005

(65) Prior Publication Data

US 2006/0138862 A1 Jun. 29, 2006

(30) Foreign Application Priority Data

Dec. 28, 2004 (JP) .................. P. 2004-378958

(51) Int. Cl.
*G08B 1/08* (2006.01)
*H04Q 1/30* (2006.01)
*G05B 11/01* (2006.01)

(52) U.S. Cl. ............ 340/538; 340/538.11; 340/538.17; 340/310.12

(58) Field of Classification Search ................. 340/538
See application file for complete search history.

(56) References Cited

U.S. PATENT DOCUMENTS

| 5,991,269 A | 11/1999 | Williamson et al. |
| 2003/0156014 A1 | 8/2003 | Kodama et al. |
| 2004/0120249 A1 | 6/2004 | Claret et al. |
| 2004/0131123 A1 | 7/2004 | Maki et al. |

FOREIGN PATENT DOCUMENTS

| EP | 1014640 | 6/2000 |
| EP | 1411645 | 4/2004 |
| JP | 2003152671 | 5/2003 |
| JP | 2003218831 | 7/2003 |
| JP | 2004080441 | 3/2004 |
| JP | 2004140565 | 5/2004 |

OTHER PUBLICATIONS

International Search Report dated Mar. 13, 2006.

*Primary Examiner*—Donnie L. Crosland
(74) *Attorney, Agent, or Firm*—Stevens, Davis, Miller & Mosher, LLP

(57) ABSTRACT

A communication apparatus includes a transmission signal generation section 1, a transmission signal control section 2, a transmission section 3, a leakage electric power detection section 4, and an electric power control judgment section 5. The transmission signal generation section 1 generates a transmission signal for carrying out transmission using a plurality of sub-carriers, under control of the transmission signal control section 2, and has a transmission electric power control function with respect to each sub-carrier. The leakage electric power detection section 4 detects electric power which is leaked from a transmission line 9 among transmission electric power. The electric power control judgment section 5 judges necessity of transmission electric power control by the transmission signal control section 2, on the basis of a leakage electric power signal from the leakage electric power detection section 4, and in case that it was judged that transmission electric power control is necessary, it notifies that effect to the transmission signal control section 2. The transmission signal control section 2 controls transmission electric power of a sub-carrier, on the basis of the leakage electric power signal from the leakage electric power detection section 4.

21 Claims, 11 Drawing Sheets

COMMUNICATION APPARATUS AND COMMUNICATION METHOD

BACKGROUND

This invention relates to a communication apparatus and a communication method which carry out wired transmission using a plurality of sub-carriers.

A transmission system using a plurality of sub-carriers such as an OFDM (Orthogonal Frequency Division Multiplexing) system is utilized for not only wireless communication but also wired communication. A transmission system using a plurality of sub-carriers has such an advantage that high quality communication becomes possible even in a harsh line. However, there is such a case that leakage electric power becomes greater, depending on quality of a transmission line and an influence is exercised on an outside.

In addition, in communication of the OFDM system, it is known a communication system which carries out transmission electric power control on a transmission side on the basis of an electric power measurement result on a reception side (see, Japanese Patent Publication JP-A-2003-152671). A system shown in the publication JP-A-2003-152671 obtains difference information between a reception electric power value of a sub-carrier which was detected on a reception side and a specified reception electric power and notifies it to a transmission side, in multi-carrier wireless communication, and controls transmission electric power of a sub-carrier on a transmission side which received the difference information. In addition, Japanese Patent Publication describes a technology for selecting a subcarrier to be used, depending on a state of a communication error detected on a reception side, in wired transmission of the OFDM system.

However, technologies shown in the Patent Publications JP-A-2003-152671 and JP-A-2003-218831 control transmission signals by utilizing a processing results of a reception signal on a reception side.

Japanese Patent Publication JP-A-2004-140565 describes a balance transmission apparatus which detects a balance component (mutually related with leakage electric power of a transmission line) from a voltage or a current of a conductor on a transmission side or a reception side, and carries out transmission control in such a manner that the detected unbalance component gets smaller.

However, Japanese Patent Publication JP-A-2004-140565 does not describe about a concrete method for transmission control based on an unbalance component.

SUMMARY

The invention is made in view of the above-described circumstances, and aims to provide a communication apparatus and a communication method which reduces processing burden for controlling leakage electric power from a power line, and enable effective transmission depending on a state of the power line.

A communication apparatus of the invention is a communication apparatus which transmits a transmission signal using a plurality of sub-carriers through a power line, and is equipped with an unbalanced component detection section which detects an unbalanced component that corresponds to electromagnetic radiation from the above-described power line, and an electric power control judgment section which calculates leakage electric power in a frequency band that corresponds to all or a part of the above-described sub-carriers, on the basis of the unbalanced component detected by the above-described unbalanced component detection section, and compares the calculated leakage electric power value corresponding to at least one sub-carrier with a first threshold value, and compares the calculated leakage electric power value corresponding to at least one sub-carrier with a second threshold value which is lower than the above-described first threshold value, and judges whether electric power control of the above-descried transmission signal is necessary or not, on the basis of these comparison results.

According to the invention, it is possible to reduce processing burden for controlling leakage electric power from a power line, and effective transmission depending on a state of the power line becomes possible. That is, necessity of electric power control is judged on the basis of a comparison result of leakage electric power and the first threshold value and the second threshold value, and electric power control is executed depending on its judgment result, and therefore, it is possible to effectively carry out electric power control for which processing burden is large and which causes lowering of communication efficiency.

DETAILED DESCRIPTION

Hereinafter, embodiments of the invention will be descried by use of drawings.

Figure 1:
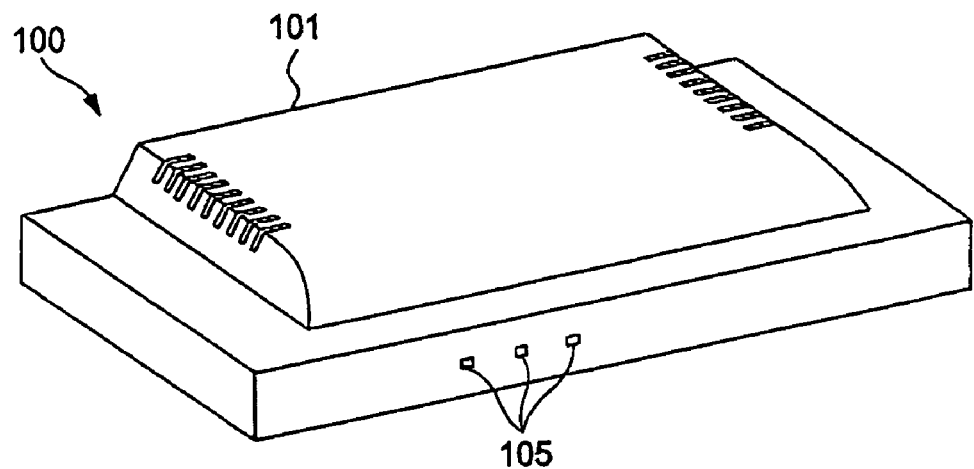
FIG. 1 is an external appearance perspective view which shows a front surface of a communication apparatus.
Figure 2:
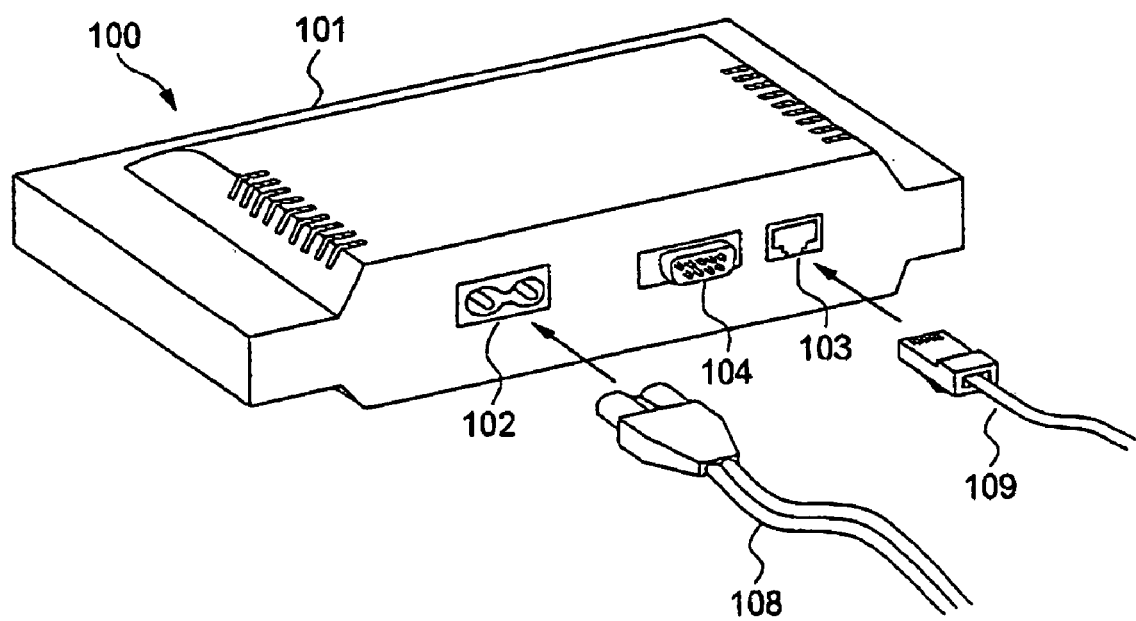
FIG. 2 is an external appearance perspective view which shows a back surface of the communication apparatus.

FIG. 1 is an external appearance perspective view which shows a front surface of a communication apparatus, and FIG. 2 is an external appearance perspective view which shows a back surface of the communication apparatus. A communication apparatus 100 in this embodiment is a modem as shown in FIGS. 1 and 2. The communication apparatus 100 has a housing 101. On a front surface of the housing 101, a display section 105 such as LED (Light Emitting Diode) is disposed as shown in FIG. 1. On a back surface of the housing 101, a power connector 102, a LAN (Local Area network) modular jack 103 such as RJ45, and a D-sub connector 104 are disposed as shown in FIG. 2. To the power connector 102, a pair of transmission lines 91, 92, which are power lines such as a parallel cable, are connected as shown in FIG. 2. To the modular jack 103, a LAN cable 109 is connected. To the D-sub connector 104, a D-sub cable, which is not shown in the figure, is connected. Meanwhile, as one example of the communication apparatus, the model in FIGS. 1 and 2 was shown but there is particularly no need to limit to a modem, and it is also all right even if the communication apparatus is an electric device which is equipped with a modem (e.g., a household electric appliance such as TV).

Figure 3:
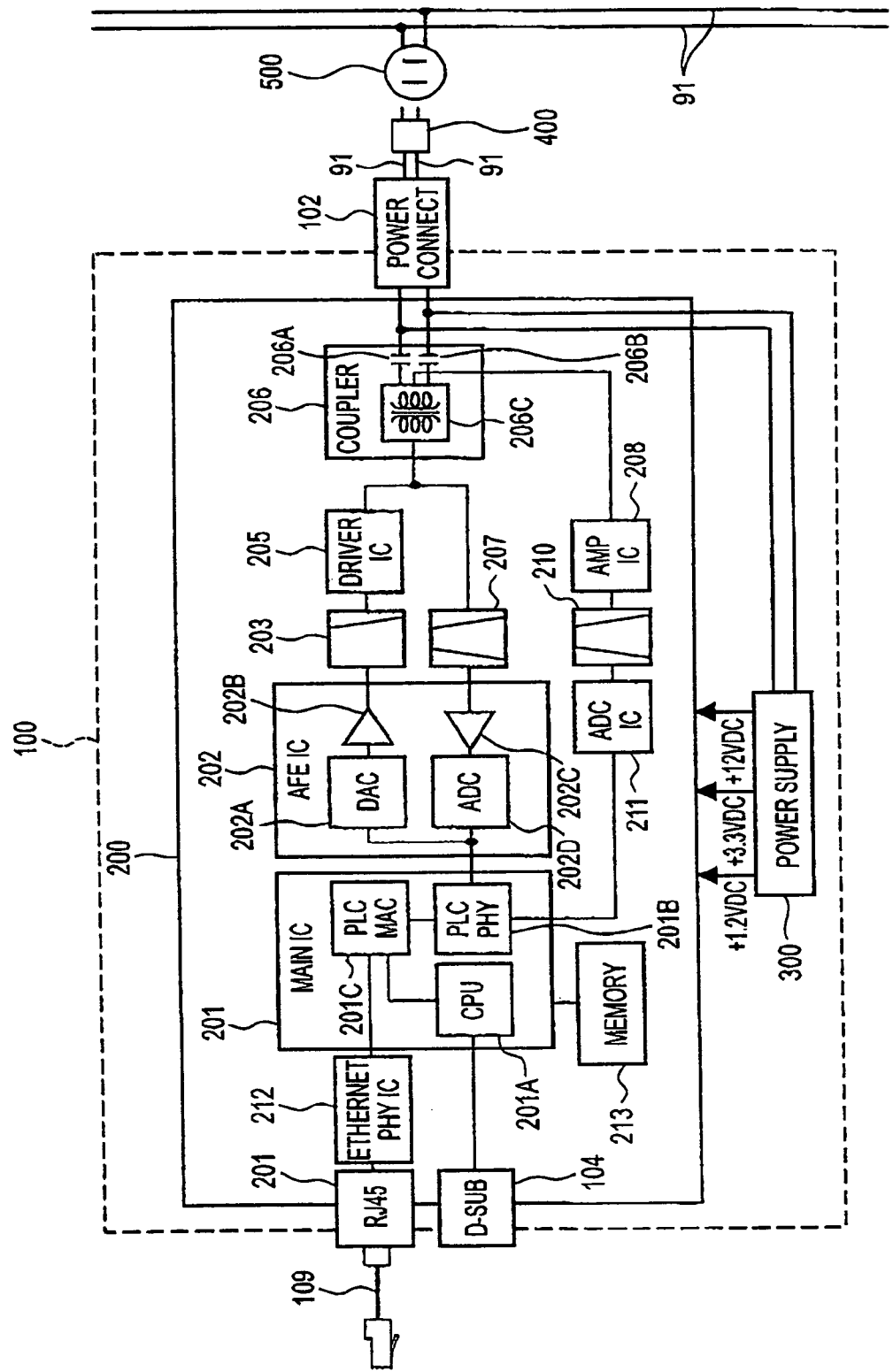
FIG. 3 is a block diagram which shows one example of hardware of the communication apparatus.

FIG. 3 is a block diagram which shows one example of hardware of the communication apparatus. The communication apparatus 100 has a circuit module 200 and a switching power supply 3000 as shown in FIG. 3. The switching power supply 300 supplies various voltages (e.g., +1.2V, +3.3V+12V) to the circuit module 200. In the circuit module 200, a main IC 201, an AFE IC (Analog Front End IC) 202, a low pass filter 203, a driver IC 205, a coupler 206, a band pass filter 207, an AMP (amplifier) IC 208, a band pass filter 210, an ADC (AD Conversion) IC 211, a memory 213, and an Ethernet PHY IC 212 are disposed. The power connector 102 is connected to the pair of transmission lines 91, 92 through a plug 400 and a socket 500.

The main IC 201 is configured by CPU (Central Processing Unit) 210A, a PLC MAC (Power Line Communication Media Access Control layer) block 201C, and a PLC PHY (Power Line Communication Physical layer) block 201B. A 32 bit RISC (Reduced Instruction Set Computer) processor is mounted on CPU 201A. The PLC MAC block 201C manages a MAC layer of a transmission signal, and the PLC PHY block 201B manages a PHY layer of the transmission signal. The AFE IC 202 is configured by a DA converter (DAC) 202A, an AD converter (ADC) 202D, and variable amplifiers (VGA) 202B, 202C. The coupler 206 is configured by a coil transformer 206C and coupling capacitors 206A, 206B.

Figure 4:
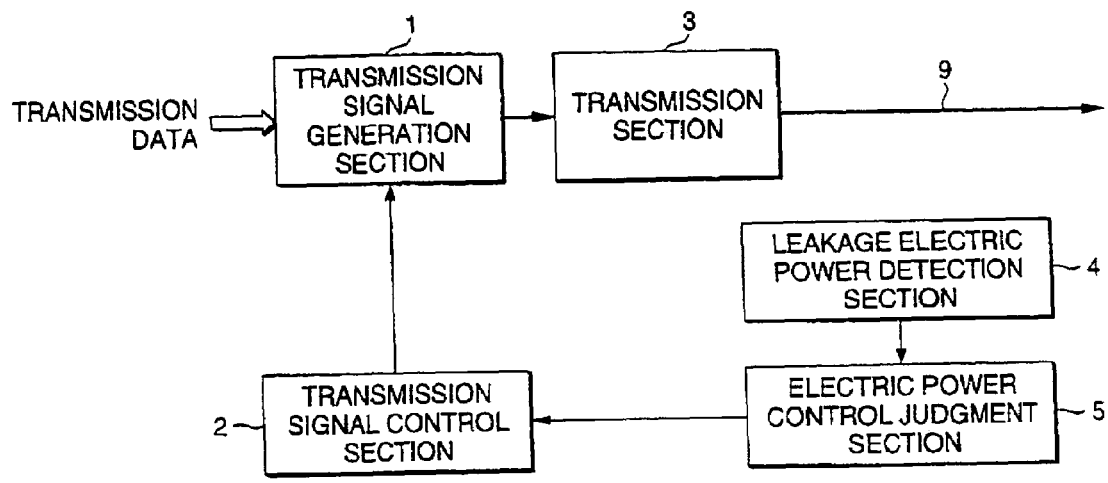
FIG. 4 is a view which shows a schematic configuration of one example of a communication apparatus in an embodiment of the invention.

FIG. 4 shows a schematic configuration of one example of a communication apparatus in an embodiment of the invention. A communication apparatus of FIG. 4 is configured by including a transmission signal generation section 1, a transmission signal control section 2, a transmission section 3, a leakage electric power detection section 4, and an electric power control judgment section 5. The transmission signal generation section 1 and the transmission signal control section 2 function as an electric power control section which controls electric power of a transmission signal The transmission signal generation section 1 generates a transmission signal (multi-carrier transmission signal) for carrying out transmission using a plurality of sub-carriers, under control of the transmission signal control section 2, and has a transmission electric power control function with respect to each sub-carrier. A transmission system using a plurality of sub-carriers is, for example, an OFDM system utilizing wavelet transformation as shown in JP-A-2003-218831.

Meanwhile, the transmission signal generation section 1 is realized by the main IC 201 in FIG. 3. The transmission section 3 is realized by the main IC 201, the ADC IC 211 and the band pass filer 210 which were shown in FIG. 3. The leakage electric power detection section 4 is realized by the coupler 206 and the AMP IC 208.

In case of utilizing the OFDM system which utilizes wavelet transformation, the transmission signal generation section 1 maps a plurality of bit strings from transmission data onto a signal point of each subcarrier, and carries out wavelet inverse transformation on the basis of the mapped signal point data of each sub-carrier, and carries out analog conversion of time wave form grouping data to which wavelet inverse transform was applied, to generate a transmission signal. On that occasion, a modulation system and transmission electric power with respect to each sub-carrier are set up by a control signal from the transmission signal control section 2.

The transmission signal control section 2 carries out control of transmission electric power with respect to each sub-carrier, and control of transmission signal generation processing including selection of a modulation system, which will be described later. The transmission section 3 outputs a transmission signal coming from the transmission signal generation section 1 to the transmission line 9, and also carries out gain adjustment etc. of an entire transmission signal. Control of transmission electric power by the transmission signal control section 2 is carried out in case that there was notification from the electric power control judgment section.

The leakage electric power detection section 4 is a sample of an unbalanced component detection section. The unbalanced component detection section detects an unbalanced component corresponding to electromagnetic radiation from power line. The unbalanced component means characteristic value indicating degree of the electromagnetic radiation. The unbalanced component includes leakage electric power (unit: dBm) of the electromagnetic radiation. The unbalanced component includes also current (unit: A or voltage (unit: V) detected at a winding of a current transformer.

The leakage electric power detection section 4 directly detects electric power which is leaked from the transmission line 9 among transmission electric power. The leakage electric power detection section 4 is equipped with a loop antenna which was disposed in the vicinity of the transmission line 9 as one example, and outputs a leakage electric power signal which corresponds to sub-carrier frequency of a transmission signal. This leakage electric power signal shows leakage electric power from the transmission line 9. The loop antenna may be disposed in an inside of a housing (not shown in the figure) of a communication apparatus, and may be also disposed separately. In addition, it is also possible to utilize an induction coil in lieu of the loop antenna.

The electric power control judgment section 5 judges necessity of transmission electric power control by the transmission signal control section 2, on the basis of a leakage electric power signal from the leakage electric power detection section 4, and, in case that it was judged that transmission electric power control is necessary, notifies that effect to the transmission signal control section 2. The electric power control judgment section 5 calculates leakage electric power with respect to each of plural frequency bands which correspond to sub-carriers, and compares leakage electric power with respect to each of these frequency bands and a first threshold value and a second threshold value, and judges necessity of transmission electric power control depending on a comparison result.

The first threshold value shows a level for judging such necessity that balancing of the transmission line 9 is not good and transmission electric power is suppressed, and the second threshold value shows a level for judging that balancing of the transmission line 9 was improved, as to a sub-carrier in which an operation of suppressing transmission electric power was carried out. Detail of judgment processing of necessity of electric power control will be described later.

Figure 5:
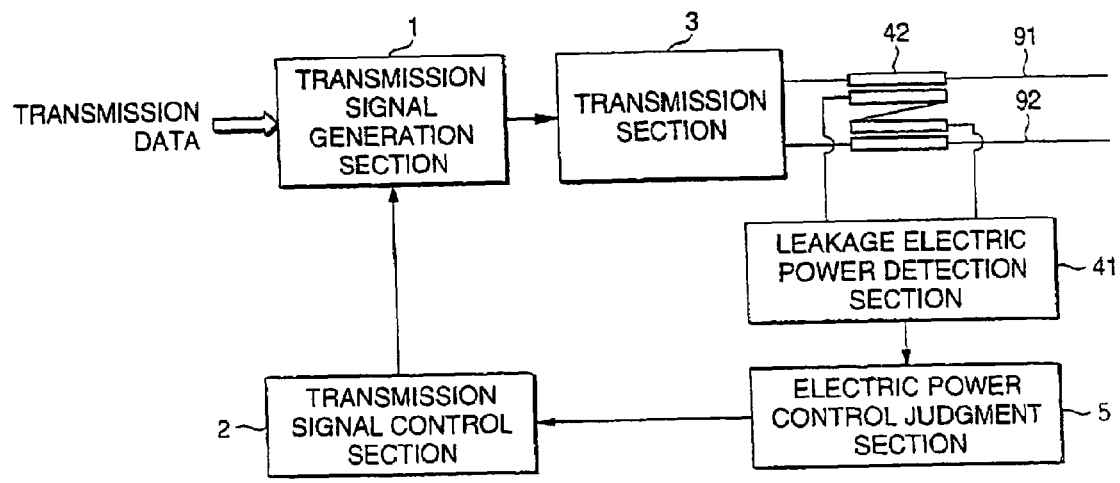
FIG. 5 is a view which shows a schematic configuration of another example of a communication apparatus in an embodiment of the invention.

FIG. 5 shows a schematic configuration of another example of a communication apparatus in an embodiment of the invention. The communication apparatus of FIG. 5 is the same as the communication apparatus of FIG. 4, except for such a point that leakage electric power is detected indirectly, by utilizing a signal which is transmitted on a pair of transmission lines. Since an element to which an identical number was applied is same, an explanation will be omitted.

To a pair of transmission lines 91, 92 shown in FIG. 5, a current transformer 42 is serially connected, and a secondary winding of the current transformer 42 is connected serially. When the secondary winding of the current transformer 42 is connected so as to detect electric currents of the transmission lines 91, 92 in an identical direction as shown in FIG. 5, a secondary winding current is to show an unbalance component which corresponds to leakage electric power from the transmission lines 91, 92. A leakage electric power detection section 41 of FIG. 5 outputs a leakage electric power signal which corresponds to sub-carrier frequency of a transmission signal, on the basis of the secondary winding current of the current transformer 42.

Figure 6:
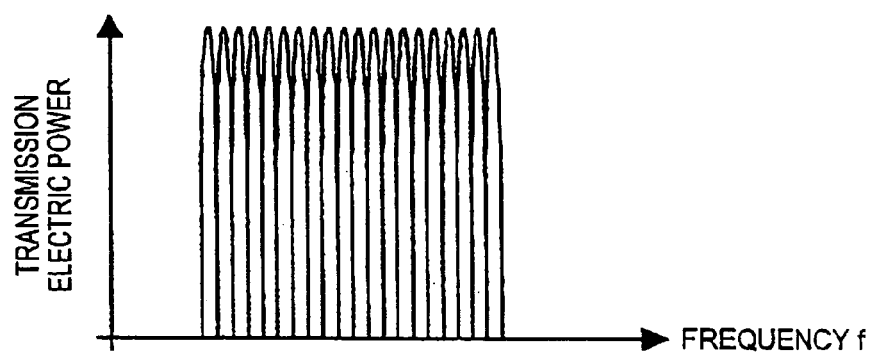
FIG. 6 is a frequency spectrum chart of a transmission signal in case that transmission electric power of each sub-carrier was made constant.
Figure 7:
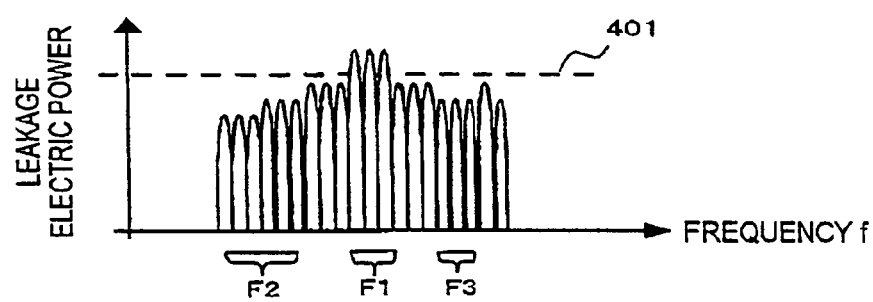
FIG. 7 is a view which shows one example of a frequency spectrum of leakage electric power.

Next, transmission electric power control of the communication apparatuses shown in FIG. 4, FIG. 5 will be described. It is assumed that a transmission signal, in which transmission electric power of each sub-carrier was made constant, is outputted from the transmission signal generation section 1. FIG. 6 is a frequency spectrum chart of the transmission signal in that case. Even if the suchlike transmission signal is outputted, it is leaked depending on a frequency characteristic which corresponds to states etc. of the transmission lines 9, 91, 92. FIG. 7 shows one example of a frequency spectrum of leakage electric power. In an example of FIG. 7, a subcarrier in a frequency band F1 exceeds a predetermined threshold value 401. In the suchlike case, the transmission signal control section 2 receives notification from the electric power control judgment section 5, and controls an operation of the transmission signal generation section 1, on the basis of a leakage electric power signal as shown in FIG. 7, which is inputted from the leakage electric power detection sections 4, 41, and controls transmission electric power of a sub-carrier.

Figure 8:
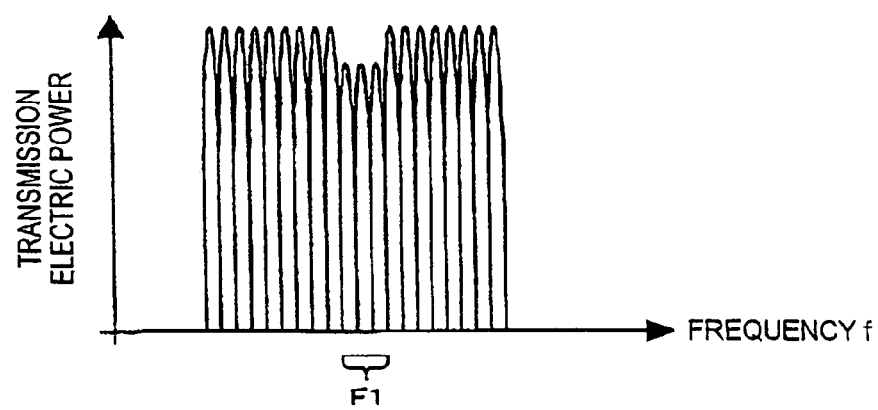
FIG. 8 is a view which shows one example of a frequency spectrum of a transmission signal in which transmission electric power was controlled, in a transmission apparatus of an embodiment of the invention.

One example of control of transmission electric power of a sub-carrier is of reduces transmission electric power of a sub-carrier with such frequency that leakage electric power exceeded a predetermined value. FIG. 8 shows a frequency spectrum of such a transmission signal that transmission electric power is controlled. In an example of FIG. 8, transmission electric power of a sub-carrier in the frequency band F1 in which leakage electric power exceeds a predetermined threshold value 401 is slightly lowered. An amount to be lowered may be determined in advance, or may be also adjusted depending on variation from the threshold value 401.

Figure 9:
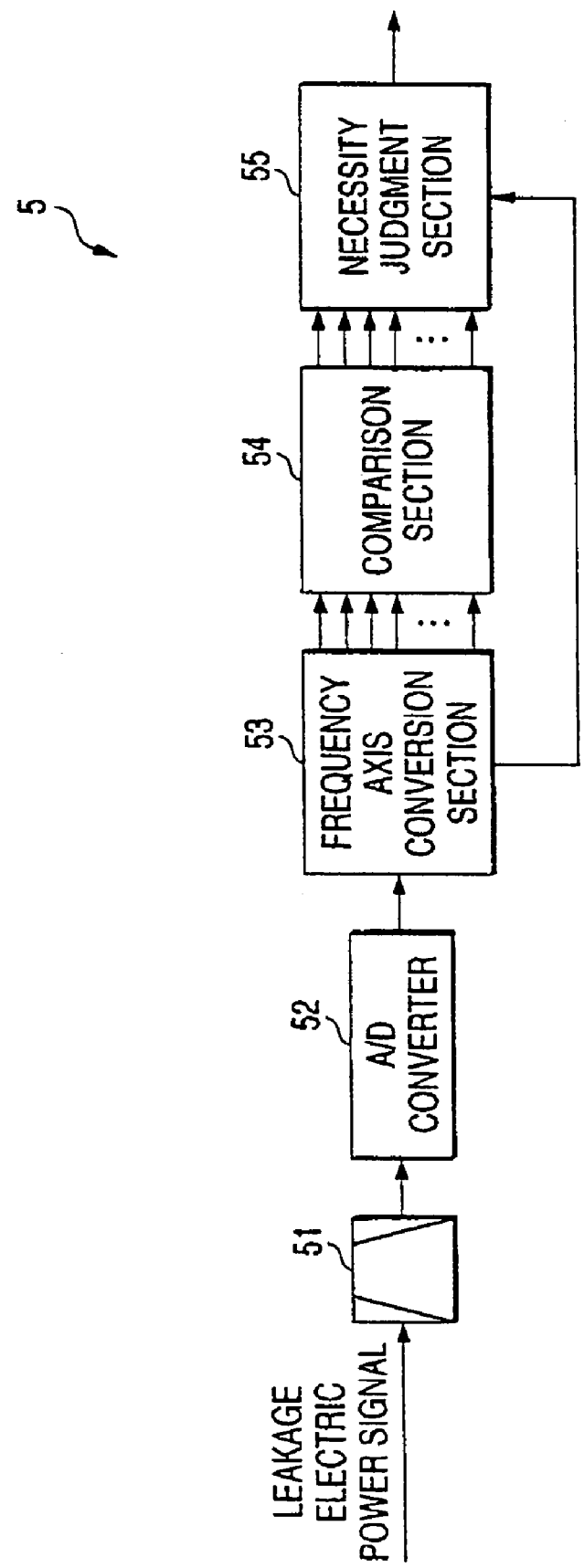
FIG. 9 is a view which shows a schematic configuration of one example of an electric power control judgment section in a transmission apparatus of an embodiment of the invention.

The number of times for lowering is not limited to one time, but it is also all right even if a plurality of times is lowered until leakage electric power becomes the threshold value 401 or less. In addition, it is also all right even if transmission electric power of a sub-carrier in the frequency band F1 in which leakage electric power exceeds the predetermined threshold value 401 is zeroed. FIG. 9 shows a frequency spectrum of the transmission signal in that case. Meanwhile, to zero transmission electric power of a specific sub-carrier means not to use that sub-carrier.

Next, judgment of necessity of electric power control will be described. FIG. 9 shows a schematic configuration of one example of the electric power control judgment section 5. The electric power control judgment section 5 of FIG. 9 is configured by including a band pass filter 51, an A/D converter 52, a frequency axis conversion section 53, a comparison section 54, and a necessity judgment section 55.

The band pass filter 51 removes unnecessary low frequency component and high frequency component that are included in a leakage electric power signal and extracts only a component in a frequency band that is utilized for multi-carrier communication, and a component, which has passed through the band pass filter 51, is converted into a digital signal in the A/D converter 52, and send to the frequency axis conversion section 53. The frequency axis conversion section 53 generates a frequency spectrum of the inputted digital signal. The comparison section 54 compares the generated frequency spectrum with a first threshold value and a second threshold value with respect to each predetermined frequency band (concretely speaking, with respect to each sub-carrier frequency band), and a comparison result is sent to the necessity judgment section 55. Meanwhile, the comparison section 54 of FIG. 9 is described as an example to compare outputs from the frequency axis conversion section 53 in parallel, but it is all right even if they are compared sequentially with respect to each predetermined frequency band. In addition, the first threshold value and the second threshold value have been set up in advance, in consideration of a state of a transmission line, maximum transmission electric power of a communication apparatus and so on.

Figure 10:
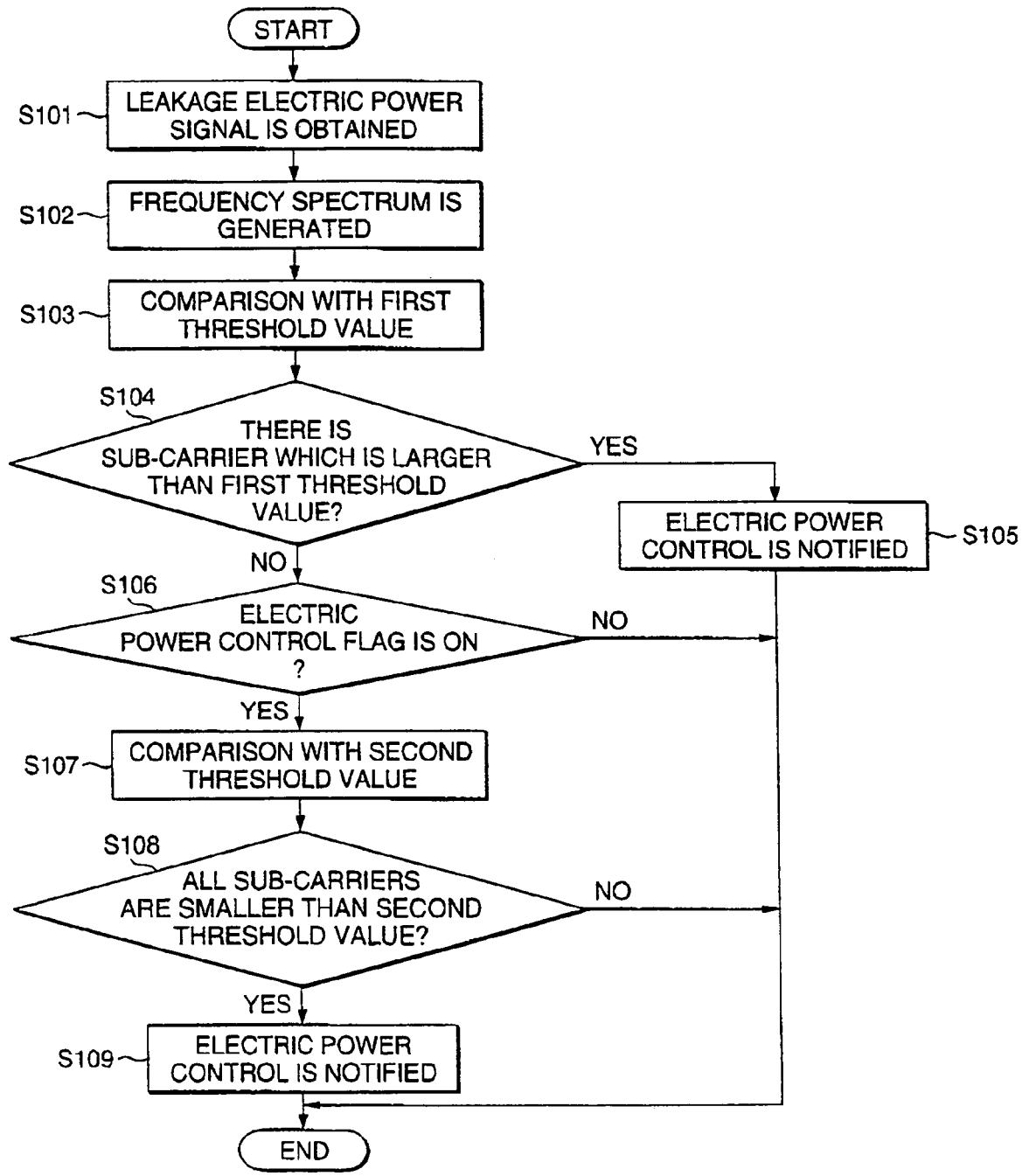
FIG. 10 is a view which shows a schematic operation flow of an electric power control judgment section in a transmission apparatus of an embodiment of the invention.

FIG. 10 shows a schematic operation flow of the electric power control judgment section 5. The electric power control judgment section 5 judges necessity of electric power control by the transmission signal control section at predetermined timing, e.g., at the time of communication start or at a predetermined time interval. On the occasion of judgment, it is all right even if a leakage electric power signal at the time that transmission electric power of all sub-carriers was made constant is utilized, or a leakage electric power signal during a period of a communication operation is utilized. Meanwhile, it is all right even if judgment of necessity of electric power control is carried out on a steady basis.

In a step S101, a leakage electric power signal is obtained from the leakage electric power detection section 4 or 41. Then, by utilizing the band pass filter 51, the A/D converter 52 and the frequency axis conversion section 53, a frequency spectrum is generated (step S102). In the comparison section 54, it is firstly compared with the first threshold value with respect to each sub-carrier (step S103), and it is judged whether there is a sub-carrier which is larger than the first threshold value or not (step S104). In case that there is even one sub-carrier which is larger than the first threshold value, it means that a state of balancing of a transmission line is not good, and therefore, it is notified to the transmission signal control section 2 that electric power control is carried out and brought to completion (step S105).

In case that there is no sub-carrier which is larger than the first threshold value, it is judged whether an electric power control flag is ON or not, and in case that it is no ON, it is brought to completion as it is (step S106). The electric power control flag (not shown in the figure) is a flag which is turned ON and OFF depending on a control state of the transmission signal control section 2, and shows whether electric power of a transmission signal from the transmission signal generation section 1 is in an initial state or not. In the initial state, electric power control is not carried out, and a transmission signal with maximum electric power is outputted from the transmission signal generation section 1, and the electric power control flag is set to OFF. The electric control flag is disposed on, for example, the transmission signal control section 2.

In case that it was judged that the electric control flag is ON, it is compared with the second threshold value with respect to each sub-carrier, in a step S107. Then, it is judged whether leakage electric power of all sub-carriers is smaller than the second threshold value or not (step S108). In case that leakage electric power of all sub-carriers is smaller than the second threshold value, it means that leakage electric power goes low and balancing of a transmission line was improved, and therefore, it is notified to the transmission signal control section 2 that electric power control is carried out and brought to completion (step S109). In case that there remains a sub-carrier which is larger than the second threshold value, it is interpreted that improvement of balancing is insufficient and it is brought to completion as it is.

Figure 11:
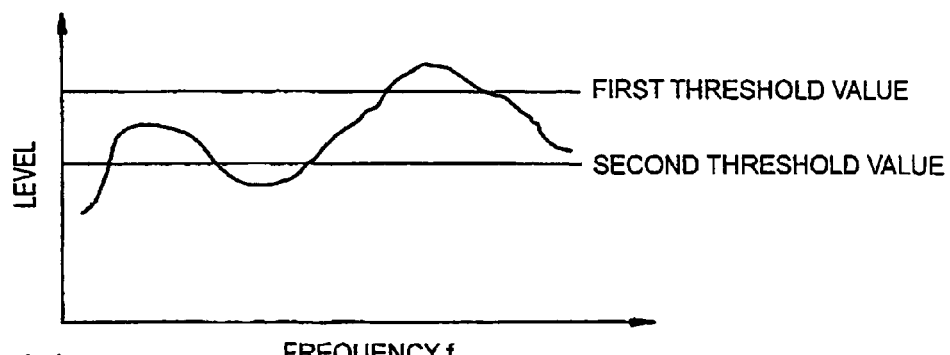
FIGS. 11(a) to 11(c) are views which show an example of a frequency spectrum of leakage electric power which is obtained from a frequency axis conversion section in a transmission apparatus of an embodiment of the invention.
Figure 11:
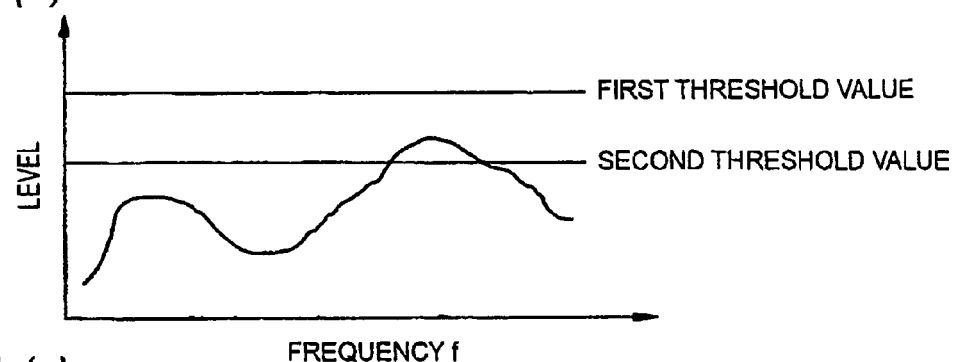
Figure 11:
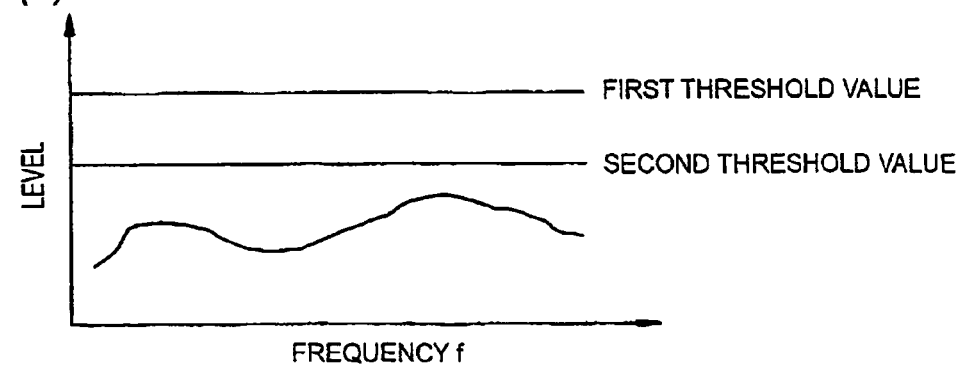

FIG. 11 shows an example of a frequency spectrum of leakage electric power which is obtained from the frequency axis conversion section 53. In case of FIG. 11(*a*), there is a sub-carrier which is larger than the first threshold value, and therefore, it is judged to be YES in the step S104, and notification to carry out electric power control is carried out. In case of FIG. 11(*b*), even when it is judged to be NO in the step S104 and it is judged to be YES in a step S106, it is judged to be NO in a step S108, and therefore, notification to carry out electric power control is not carried out. In case of FIG. 11(*c*), it is judged to be YES in the step S108 at the time of electric control flag ON, and therefore, notification to carry out electric power control is carried out.

Figure 12:
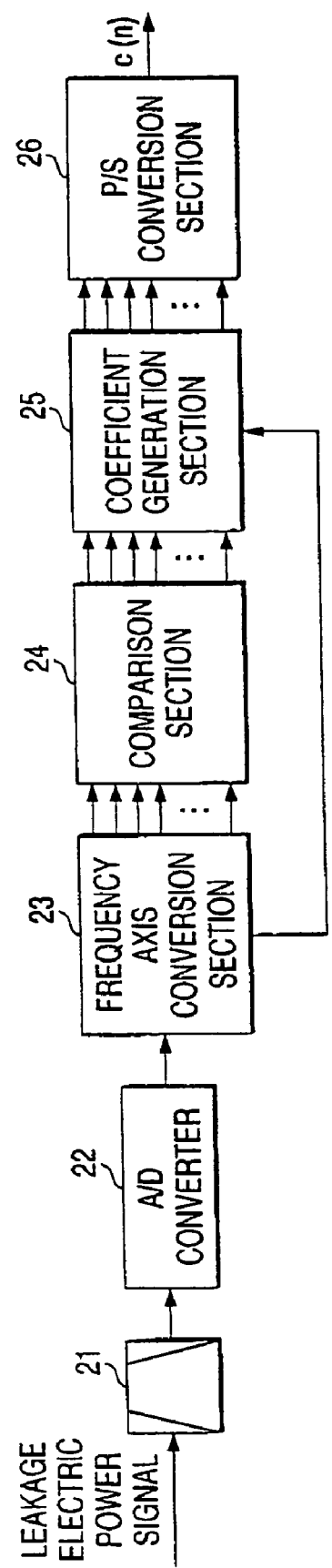
FIG. 12 is a view which shows a schematic configuration of one example of a transmission signal control section in a transmission apparatus of an embodiment of the invention.

Next, an operation of the transmission signal control section 2 will be described. FIG. 12 shows a schematic configuration of one example of the transmission signal control section 2. The transmission signal control section 2 of FIG. 12 generates a transmission electric power control signal c(n) for controlling transmission electric power with respect to each sub-carrier on the basis of the detected leakage electric power signal, and is configured by including a band pass filter 21, an A/D converter 22, a frequency axis conversion section 23, a comparison section 24, a coefficient generation section 25, and a parallel/serial conversion section (P/S conversion section) 26.

The band pass filter 21 is removes unnecessary low frequency component and high frequency component that are included in a leakage electric power signal and extracts only a component in a frequency band that is utilized for multi-carrier communication, and it is converted into a digital signal in the A/D converter 22, and sent to the frequency axis conversion section 23. The frequency axis conversion section 23 generates a frequency spectrum of the inputted digital signal. The comparison section 24 compares the generated frequency spectrum with a first threshold value and a second threshold value with respect to each predetermined frequency band (concretely speaking, with respect to each sub-carrier frequency band), and outputs a result to the coefficient generation section 25.

The band pass filter 21, the A/D converter 22, the frequency axis conversion section 23, and the comparison section 24 have functions which are similar to those of the band pass filter 51, the A/D converter 52, the frequency axis conversion section 53 and the comparison section 54 shown in FIG. 9, and therefore, all or a part of them may be shared.

The coefficient generation section generates a compensation signal with respect to each sub-carrier, on the basis of an output of the comparison section 24 and phase data from the frequency axis conversion section 23. An output from the coefficient generation section 25 is outputted as a transmission electric power control signal c(n), by converting the compensation signal with respect to each sub-carrier into a serial signal in the P/S conversion section 26. Here, n shows a number of a sub-carrier.

Meanwhile, the transmission signal control section 2 shown in FIG. 12 is one example, and it is all right even if an equalizer is further added thereto so as to compensate a transmission line characteristic, a detector characteristic, or another characteristic of a control system. In addition, it is also all right even if a circuit configuration is simplified without utilizing phase data and a compensation signal is changed stepwise, and the compensation signal is changed depending on its amplitude response.

Figure 13:
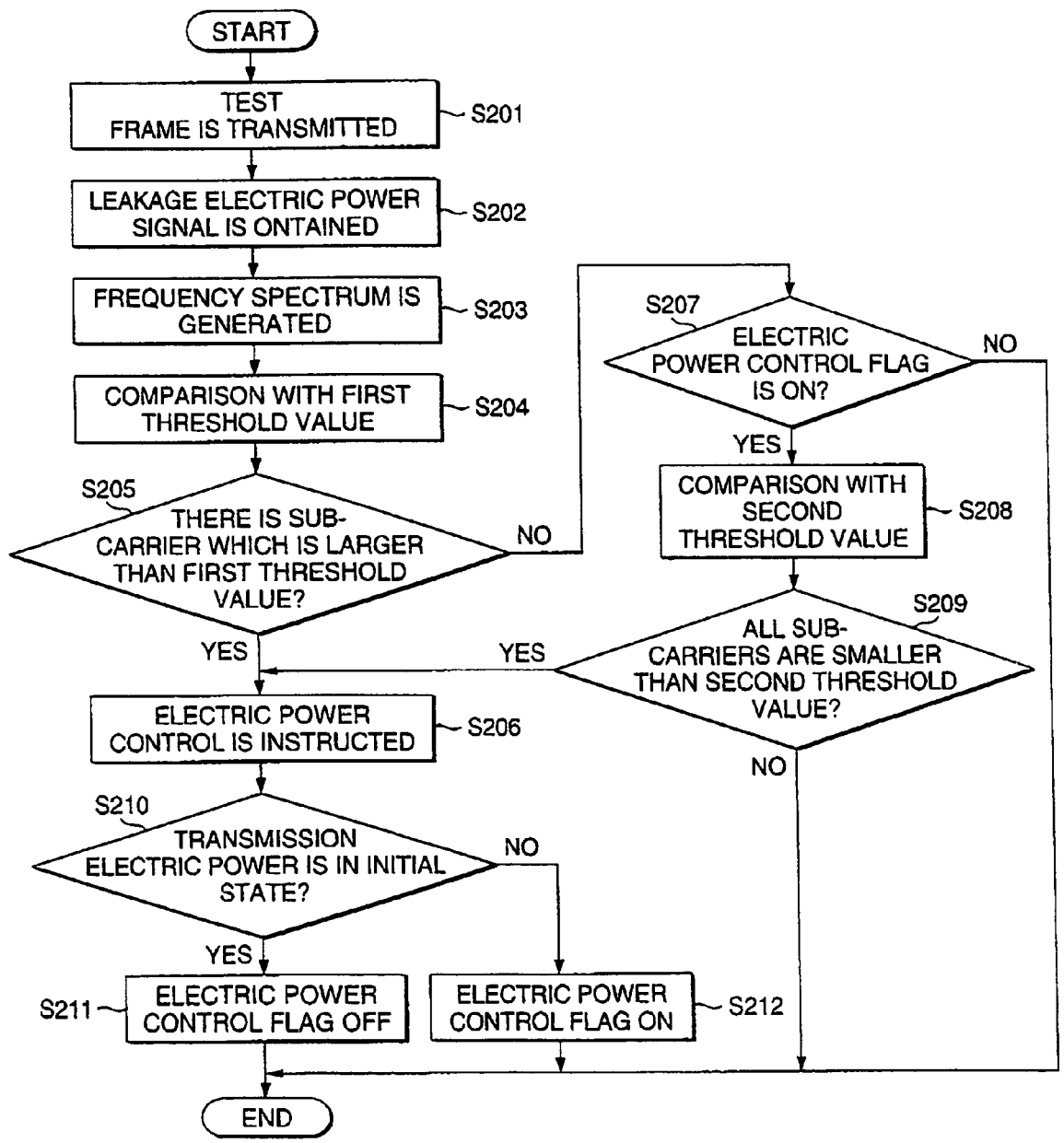
FIG. 13 is a view which shows one example of a schematic operation flow of a transmission signal control section in a transmission apparatus of an embodiment of the invention.

FIG. 13 shows one example of a schematic operation flow of the transmission signal control section 2. The transmission signal control section 2 carries out electric power control processing shown in FIG. 13, when it was notified from the electric power judgment section 5 that electric power control is carried out.

When notification to carry out electric power control is received, an instruction is given to the transmission signal generation section 1 in a step S201, to transmit a test frame. As the test frame, although ordinary transmission data may be used, it is also all right even if predetermined given data is transmitted. Meanwhile, transmission of the test frame is not indispensable, and it is also all right even if transmission data at the time that notification was received is used.

In a step S202, a leakage electric power signal is obtained from the leakage electric power detection section 4 or 41. Then, by utilizing the band pass filter 21, the A/D converter 22 and the frequency axis conversion section 23, a frequency spectrum is generated (step S203). In the comparison section 24, it is firstly compared with the first threshold value with respect to each sub-carrier (step S204), and it is judged whether there is a sub-carrier which is larger than the first threshold value (step S205). In case that there is even one sub-carrier which is larger than the first threshold value, there is need to carry out electric power control of a transmission signal, and therefore, the transmission electric power control signal c(n) is transmitted to the transmission signal control section 2, together with an electric power control instruction (step S206). Meanwhile, the transmission electric power control signal c(n) is outputted as to a sub-carrier of frequency in which leakage electric power exceeded the first threshold value. In addition, a control signal, which corresponds to an exceeded amount from the first threshold value, may be used, and it may be also changed just by a predetermined value. In this case, there is also such a case that plural times of electric power control become necessary.

In case that there is no sub-carrier which is larger than the first threshold value, it is judged whether an electric power control flag is ON or not, and in case that it is not ON, it is brought to completion as it is (step S207).

In case that it was judged that the electric power control flag is ON, it is compared with the second threshold value with respect to each sub-carrier, in a step S208. Then, it is judged whether leakage electric power of all sub-carriers is smaller than the second threshold value or not (step S209). In case that the leakage electric power of all sub-carrier is smaller than the second threshold value, it means that leakage electric power goes low and balancing of a transmission line was improved, and therefore, the transmission electric power control signal c(n) is transmitted to the transmission signal control section 2, together with an electric power control instruction (step S206). In case that there remains a sub-carrier in which leakage electric power is larger than the second threshold value, it is interpreted that improvement of balancing is insufficient and it is brought to completion as it is. Meanwhile, the transmission electric power control signal c(n) in this case is outputted as to a sub-carrier in which transmission electric power goes lower than an initial value and is less than the second threshold value In addition, it is all right even if the transmission electric power control signal c(n) is increased by just such a portion that leakage electric power is less than the above-described two threshold values, within a scope of not-exceeding transmission electric power in its initial state, or it is also all right even if it is increased just by a predetermined value. In addition, it is also all right even if transmission electric power of all sub-carriers is returned to an initial value.

In case that the transmission electric power control signal c(n) was transmitted together with the electric power control instruction in the step S206, it is judged whether transmission electric power is in an initial state or not, i.e., whether it is maximum electric power or not. Then, in case that it is in the initial state, an electric power control flag is turned OFF (step S211), and in case that it is not in the initial state, the electric power control flag is turned ON (step S212) and it is brought to completion.

Figure 14:
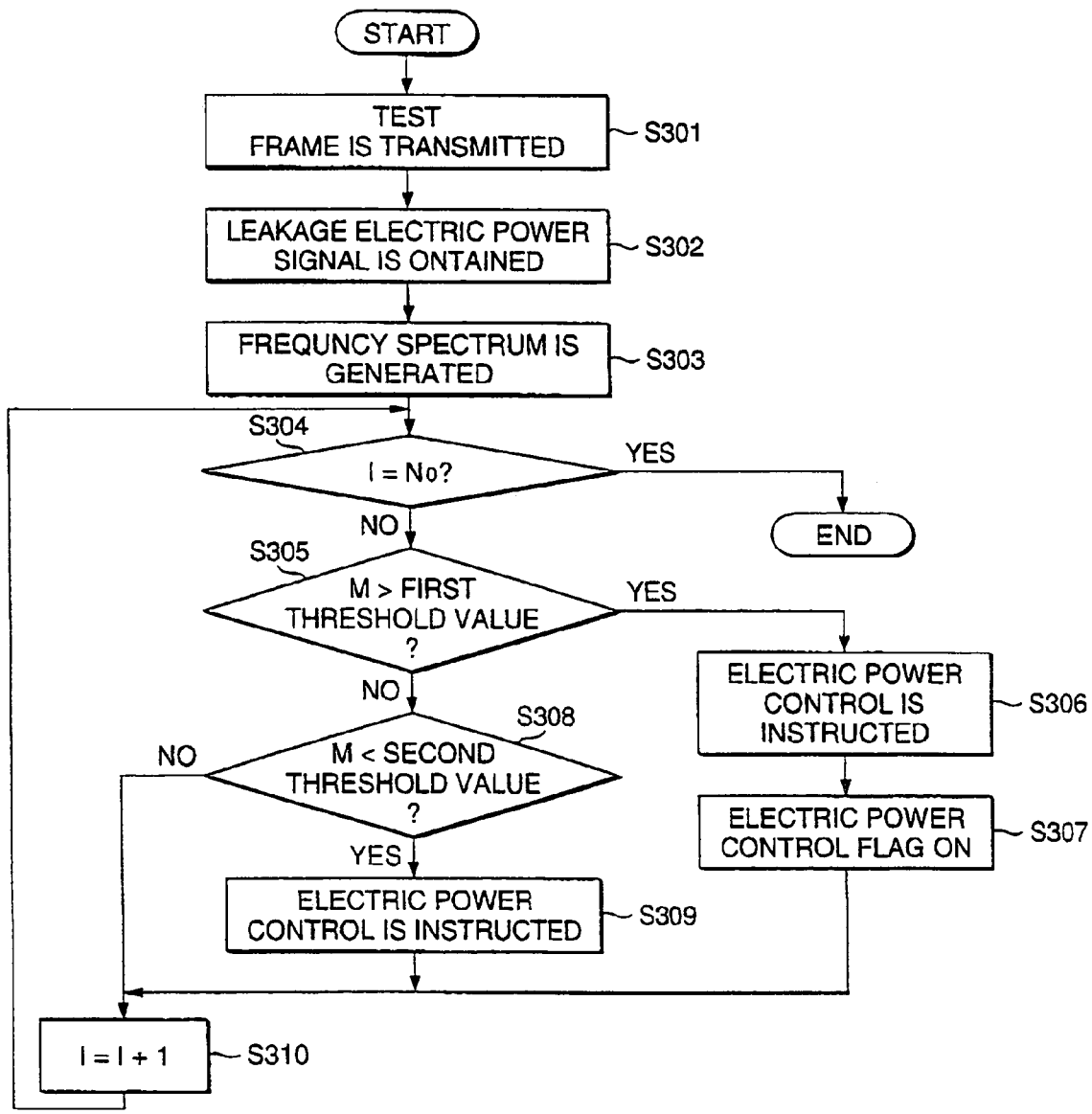
FIG. 14 is a view which shows another example of a schematic operation flow of a transmission signal control section in a transmission apparatus of an embodiment of the invention.

FIG. 14 shows another example of a schematic operation flow of the transmission signal control section 2. When notification to carry out electric power control is received, an instruction is given to the transmission signal generation section 1 in a step S301, and a leakage electric power signal is obtained from the leakage electric power detection section 4 or 41 in a step S302, and a frequency spectrum is generated in a step S303. Since the steps S301, S302 and S303 are similar to the steps S201, S202 and S203 of FIG. 13, detailed explanations will be omitted.

In the operation flow of FIG. 13, leakage electric power of all sub-carriers was compared with the first threshold value and if necessary, compared with the second threshold value, and thereafter, an electric power control instruction was given to the transmission signal control section 2 depending on a comparison result, but in the operation flow of FIG. 14, it is compared with the first threshold value with respect to each sub-carrier, and if necessary, compared with the second threshold value, and an electric power control instruction is given as to that sub-carrier depending on a comparison result.

In a step S304, it is judged whether a sub carrier number I is a maximum sub-carrier number $N_0$ or not, i.e., whether comparison for the electric power control instruction was carried out or not as to all sub-carriers. Meanwhile, the sub-carrier number I is reset to 0 at the time of operation start.

In case that the sub-carrier number I is not $N_0$, it is judged whether leakage electric power M of a sub-carrier which is shown by that sub-carrier number I exceeds the first threshold value or not (step S305), and in case that it exceeds, an electric power control instruction is outputted as to that sub-carrier (step S306). Then, the electric power control flag is turned ON (step S307), and the sub-carrier number I is counted up (step S310) and it goes back to the step S304.

In case that it was judged in the step S305 that the leakage electric power M does not exceed the first threshold value, it is judged whether the leakage electric power M is less than the second threshold value or not (step S308), and in case that it is less than that, an electric power control instruction is outputted as to that subcarrier (step S309). Then, in a step S310, the sub-carrier number I is counted up. In case that the leakage electric power M is not less than the second threshold value, it is moved to the step S310 as it is, to count up the sub-carrier number I.

Since a transmission electric power control signal c(n), which is sent together with the electric power control instruction, is the same as in FIG. 14, an explanation will be omitted. In addition, a point to turn OFF the electric power control flag in case that the leakage electric power M is less than the second threshold value and transmission electric power of all sub-carriers was returned to an initial value is also the same as in FIG. 13.

Figure 15:
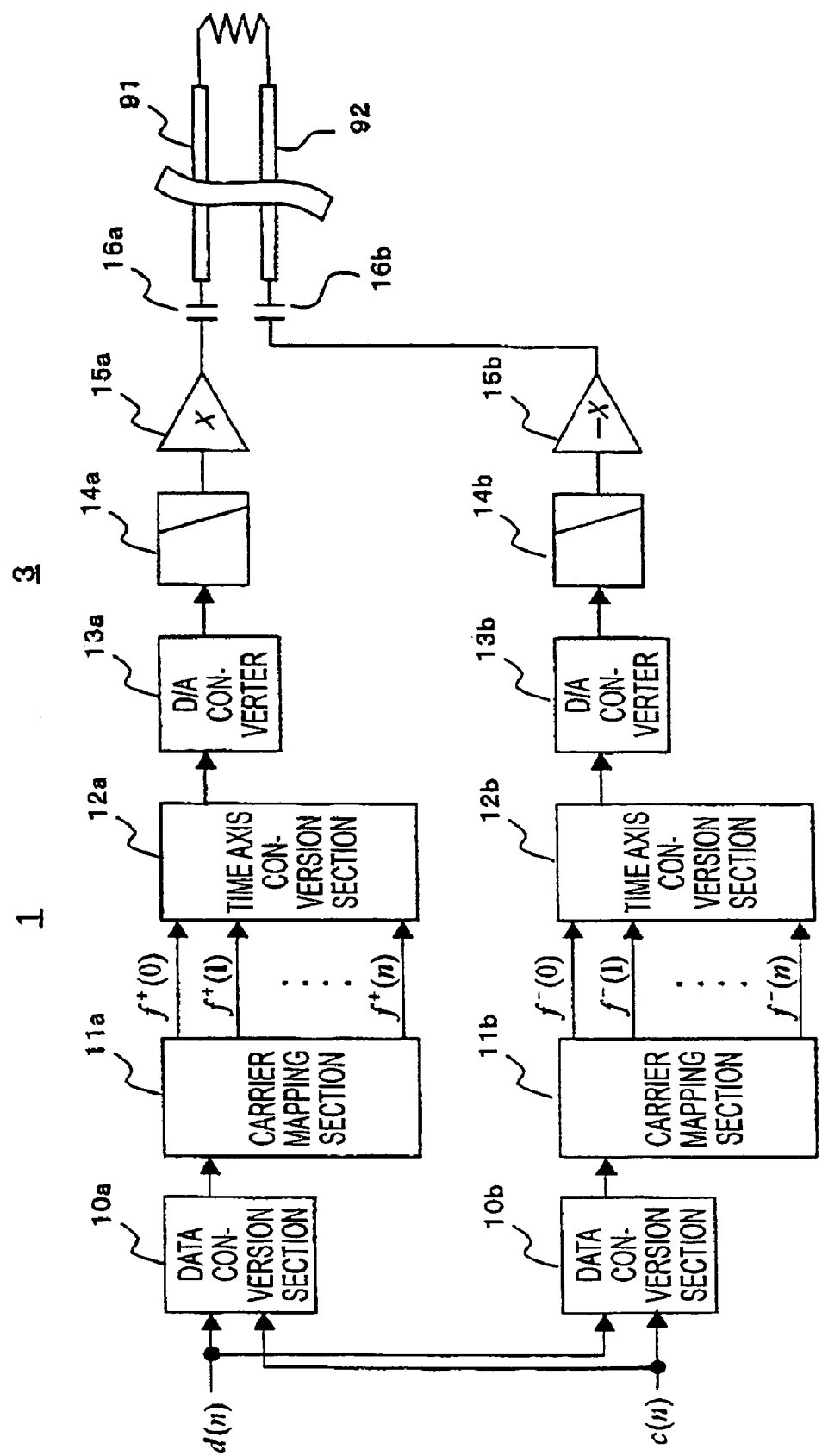
FIG. 15 is a view which shows a schematic configuration of one example of a transmission signal generation section in a transmission apparatus of an embodiment of the invention.

FIG. 15 shows a schematic configuration of one example of the transmission signal generation section 1. The transmission signal generation section 1 of FIG. 15 generates a balance transmission signal to be sent to transmission lines 91, 92, and is described including a configuration of the transmission section 3. The transmission signal generation section of FIG. 14 is configured by including data conversion sections 10a, 10b, carrier mapping sections 11a, 11b, time axis conversion sections 12a, 12b, D/A converters 13a, 13b, low pass filters 14a, 14b, amplifiers 15a, 15b, and coupling capacitors 16a, 16b. Respective these elements generate differential signals for carrying out balance transmission, respectively, and have almost the same functions.

The data conversion sections 10a, 10b convert transmission data d(n) on the basis of the transmission electric power control signal c(n) from the transmission signal control section 2 of FIG. 12 and outputs transmission data in which transmission electric power was controlled with respect to each sub-carrier, and their outputs are sent to the carrier mapping sections 11a, 11b. The carrier mapping sections 11a, 11b carry out mapping of signals on a time axis, which are inputted from the data conversion sections 10a, 10b, on a time axis, and carry out primary modulation.

If conversion in the data conversion section 10a is represented as A and conversion in the data conversion section 10b is represented as B and conversion in the carrier mapping sections 11a, 11b is represented as F, conversion for satisfying the following (formula 1) through (formula 3) is carried out. As apparent from the (formula 1) and (formula 3), a differential component of transmission data (transmit original data $f^+(n)$, $f(n)$) is generated on the basis of the transmission data d(n), and an in-phase component of conversion data is generated on the basis of the transmission electric power control signal c(n).

[Mathematical Formula 1]

$$|f^+(n)|-|f^-(n)|=|F(A(d(n), c(n)))|-|F(B(d(n), c(n)))|=|F(d(n))| \quad \text{(formula 1)}$$

$$Lf^+(n)=LF(A(d(n), c(n)))=Lf^-(n)=LF(B(d(n), c(n)))= LF(d(n)) \quad \text{(formula 2)}$$

$$(|f^+(n)|+|f^-(n)|)/2=(|F(A(d(n), c(n)))|-|F(B(d(n), c(n)))|)/2=|F(c(n))| \quad \text{(formula 3)}$$

Outputs of the carrier mapping sections 11a, 11b are sent to the time axis conversion sections 12a, 12b, and converted from data on a frequency axis to data on a time axis. The time axis conversion sections 12a, 12b carry out, for example, wavelet inverse transform. Digital data on a time axis, which is outputted from the time axis conversion sections 12a, 12b, is converted into analog data in the D/A converters 13a, 13b, and high frequency components are removed therefrom by the low pass filters 14a, 14b, and thereafter, they are inputted to the amplifiers 15a, 15b. The amplifiers 15a, 15b have amplification degrees of "X", "−X", respectively, and output transmission signals to the pair of transmission lines 91, 92 at a predetermined signal level.

In this manner, two system transmission signals for being sent out to each of the pair of transmission lines are generated separately, and those transmission signals are controlled so as to compensate unbalance (which corresponds to a leakage electric power signal) of transmission lines, and therefore, in case that unbalance was detected, respective transmission signals, which were unbalanced intentionally, are transmitted. Therefore, a reception signal, which was received through unbalanced transmission lines, becomes a balanced one as a consequence, and leakage electric power can be reduced.

In the above-described explanation, the first threshold value and the second threshold value, which are threshold values for judging necessity of electric power control, i.e., for judging a state of balancing of transmission lines, were set to predetermined fixed values, but it is all right even if they are changed depending on a state of a transmission line.

As one example, test transmission is carried out with maximum electric power at predetermined timing, for example, at the time of communication start or at determined time everyday, etc., and on the basis of an average value of leakage electric power at that time, it is determined. Concretely speaking, one threshold value among the first threshold value and the second threshold value is determined as a function of an average value of leakage electric power, and the other threshold value is determined as a value which is away from the one threshold value just by a predetermined value.

If the suchlike threshold values are utilized, it is possible to avoid such a matter that electric power control is carried out frequently depending on a state of a transmission line.

In addition, the transmission signal control section 1 utilizes the first threshold value and the second threshold value, which are utilized by the electric power control judgment section 5, as a threshold value for transmission electric power control, but it is all right even if a third threshold value, which is lower than the first threshold value, and a fourth threshold value, which is higher than the second threshold value, are utilized, in lieu of the first threshold value and the second threshold value.

If the suchlike threshold values are utilized, it is possible to avoid such a matter that electric power control is carried out frequently. For example, in case that leakage electric power of a specific sub-carrier exceeded the first threshold value, electric power control is carried out so as to reduce leakage electric power up to the third threshold value which is lower than the first threshold value, and therefore, such a possibility that electric power control becomes insufficient goes down, and such probability that it exceeds the first threshold value again and it is judged that electric power control is necessary is reduced. Much the same is true even in case that leakage electric power of a detail sub-carrier became less than the second threshold value. Therefore, it is possible to suppress processing burden for electric power control.

The invention is useful as a communication apparatus and a communication method etc. which reduce processing burden for controlling leakage electric power from a wired transmission line and enable effective transmission depending on a state of the wired transmission line.

This application is based upon and claims the benefit of priority of Japanese Patent Application No. 2004-378958. filed on Dec. 28, 2004, the contents of which are incorporated herein by reference in its entirety.

What is claimed is:

1. A communication apparatus which transmits a transmission signal using a plurality of sub-carriers through a power line, comprising:
   an unbalanced component detection section which detects an unbalanced component that corresponds to electromagnetic radiation from said power line, and
   an electric power control judgment section which calculates leakage electric power values in a frequency band that corresponds to all or a part of said sub-carriers, on the basis of unbalanced component signal detected by said unbalanced component detection section, and compares the calculated leakage electric power value corresponding to at least one sub-carrier with a first threshold value, and compares the calculated leakage electric power value corresponding to at least one sub-carrier with a second threshold value which is lower than said first threshold value, and judges whether electric power control of said transmission signal is necessary or not, on the basis of these comparison results.

2. The communication apparatus as set forth in claim 1, wherein said electric power control judgment section judges that said electric power control is necessary, in case that any leakage electric power values exceed said first threshold value, and in case that all leakage electric power values are less than said second threshold value and there is such a sub-carrier that the electric power of said transmission signal was lowered from that in an initial state.

3. The communication apparatus as set forth in claim 1, further comprising: an electric power control section which controls electric power of said transmission signal, in case that it was judged by said electric power control judgment section that electric power control of said transmission signal is necessary.

4. The communication apparatus as set forth in claim 3, wherein said electric power control section reduces the electric power of said transmission signal as to such the sub-carrier that said leakage electric power values exceed said first threshold value.

5. The communication apparatus as set forth in claim 4, wherein said electric power control section reduces the electric power of said transmission signal, by just such a portion that said leakage electric power values exceed said first threshold value.

6. The communication apparatus as set forth in claim 3, wherein said electric power control section reduces the electric power of said transmission signal as to such the sub-carrier that said leakage electric power values exceed a third threshold value which is lower than said first threshold value.

7. The communication apparatus as set forth in claim 6, wherein said electric power control section reduces the electric power of said transmission signal, by just such a portion that said leakage electric power values exceed said third threshold value.

8. The communication apparatus as set forth in claim 2, wherein said electric power control section increases the electric power of said transmission signal as to such the sub-carrier which said leakage electric power values are less than said second threshold value and the electric power of which is reduced.

9. The communication apparatus as set forth in claim 8, wherein said electric power control section increases the electric power of said transmission signal, by just such a portion that said leakage electric power is less than said second threshold value, at a range of not-exceeding the electric power of said transmission signal in its initial state.

10. The communication apparatus as set forth in claim 2, further comprising:
an electric power control section which controls the electric power of said transmission signal, in case that it was judged by said electric power control judgment section that electric power control of said transmission signal is necessary,
wherein said electric power control section increases the electric power of said transmission signal as to such the sub-carrier that said leakage electric power is less than a fourth threshold value which is higher than said second threshold value.

11. The communication apparatus as set forth in claim 10, wherein said electric power control section increases the electric power of said transmission signal, by just such a portion that said leakage electric power values are less than said fourth threshold value, at a range of not-exceeding the electric power of said transmission signal in its initial state.

12. The communication apparatus as set forth in claim 8, further comprising:
a transmission signal generation section which generates the transmission signal with maximum electric power as to all sub-carriers, in an initial state,
wherein said electric power control section turns back the electric power of all sub-carriers to the electric power in an initial state, in case that all leakage electric power values are less than said second threshold value and the electric power of said transmission signal is less than that in an initial state.

13. The communication apparatus as set forth in claim 1, wherein said first threshold value and said second threshold value are predetermined fixed values.

14. The communication apparatus as set forth in claim 1, wherein one threshold value of said first threshold value and said second threshold value is determined on the basis of an average value of leakage electric power values, and the other threshold value is determined on the basis of said one threshold value.

15. The communication apparatus as set forth in claim 1, wherein said unbalanced component detection section detects said unbalance component directly.

16. The communication apparatus as set forth in claim 1, wherein said unbalanced component detection section detects said unbalanced component indirectly, by utilizing said transmission signal which is transmitted on said power line.

17. The communication apparatus as set forth in claim 1, wherein said electric power control judgment section judges necessity of said electric power control by utilizing said unbalanced component during a period of a communication operation.

18. The communication apparatus as set forth in claim 1, wherein said electric power control section makes the electric power of all sub-carriers constant intermittently, and controls the electric power with respect to each said sub-carrier by utilizing said unbalanced component at that time.

19. The communication apparatus as set forth in claim 1, wherein said transmission signal is transmitted by utilizing an OFDM system.

20. The communication apparatus as set forth in claim 19, wherein wavelet transformation is utilized in said OFDM system.

21. A communication method which transmits a transmission signal using a plurality of sub-carriers through a power line, the method comprising the steps of:
detecting an unbalanced component that corresponds to electromagnetic radiation from said transmission line;
calculating leakage electric power values in a frequency band which corresponds to all or a part of said sub-carriers, on the basis of the detected unbalanced component;
comparing the calculated leakage electric power a first threshold value;
comparing the calculated leakage electric power value corresponding to at least one sub-carrier a second threshold value which is lower than said first threshold value; and
judging whether electric power control of said transmission signal is necessary or not, on the basis of these comparison results.

* * * * *